US011169811B2

(12) United States Patent
McCrary et al.

(10) Patent No.: US 11,169,811 B2
(45) Date of Patent: Nov. 9, 2021

(54) GRAPHICS CONTEXT BOUNCING

(71) Applicant: ADVANCED MICRO DEVICES, INC., Santa Clara, CA (US)

(72) Inventors: Rex Eldon McCrary, Orlando, FL (US); Yi Luo, Orlando, FL (US); Harry J. Wise, Orlando, FL (US); Alexander Fuad Ashkar, Orlando, FL (US); Michael Mantor, Orlando, FL (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/426,613

(22) Filed: May 30, 2019

(65) Prior Publication Data

US 2020/0379767 A1   Dec. 3, 2020

(51) Int. Cl.
*G06F 9/38* (2018.01)
*G06T 1/60* (2006.01)
*G06T 1/20* (2006.01)
*G06F 16/245* (2019.01)

(52) U.S. Cl.
CPC .......... *G06F 9/3838* (2013.01); *G06F 16/245* (2019.01); *G06T 1/20* (2013.01); *G06T 1/60* (2013.01)

(58) Field of Classification Search
CPC ........ G06T 1/20; G06F 16/245; G06F 9/3838
See application file for complete search history.

(56) References Cited

U.S. PATENT DOCUMENTS

| 7,634,637 | B1 * | 12/2009 | Lindholm | G06F 9/3851 712/13 |
| 7,979,683 | B1 | 7/2011 | Danskin et al. | |
| 8,736,624 | B1 * | 5/2014 | Mahan | G06T 15/005 345/522 |
| 10,397,362 | B1 * | 8/2019 | Volpe | H04L 67/2852 |
| 10,437,637 | B1 * | 10/2019 | Koneru | G06F 8/44 |
| 10,841,225 | B2 * | 11/2020 | Lam | H04L 47/21 |
| 2005/0195186 | A1 * | 9/2005 | Mitchell | G06T 15/40 345/421 |
| 2007/0103476 | A1 * | 5/2007 | Huang | G06F 9/461 345/522 |
| 2008/0313436 | A1 * | 12/2008 | Leather | G06F 9/3877 712/218 |
| 2010/0131549 | A1 | 5/2010 | Kramer et al. | |
| 2011/0296393 | A1 * | 12/2011 | Vidal | G06F 8/65 717/171 |

(Continued)

OTHER PUBLICATIONS

International Search Report and Written Opinion dated Sep. 3, 2020 in International Application No. PCT/US2020/035203, 10 pages.

*Primary Examiner* — Samantha (Yuehan) Wang

(57) ABSTRACT

A method of context bouncing includes receiving, at a command processor of a graphics processing unit (GPU), a conditional execute packet providing a hash identifier corresponding to an encapsulated state. The encapsulated state includes one or more context state packets following the conditional execute packet. A command packet following the encapsulated state is executed based at least in part on determining whether the hash identifier of the encapsulated state matches one of a plurality of hash identifiers of active context states currently stored at the GPU.

23 Claims, 4 Drawing Sheets

(56) References Cited

U.S. PATENT DOCUMENTS

| | | |
|---|---|---|
| 2015/0123980 A1 | 5/2015 | Nalluri et al. |
| 2016/0055609 A1 | 2/2016 | Wang et al. |
| 2018/0191632 A1* | 7/2018 | Biederman ............. H04L 69/22 |
| 2018/0285109 A1 | 10/2018 | Koker et al. |
| 2019/0188823 A1* | 6/2019 | Sansottera ................ G06T 1/60 |
| 2019/0207868 A1* | 7/2019 | Chang ................... H04L 47/805 |
| 2019/0235917 A1* | 8/2019 | Koneru ................ G06F 9/4843 |

* cited by examiner

GRAPHICS CONTEXT BOUNCING

BACKGROUND

A graphics processing unit (GPU) is a processing unit that is specially designed to perform graphics processing tasks. A GPU may, for example, execute graphics processing tasks required by an end-user application, such as a video game application. Typically, there are several layers of software between the end-user application and the GPU. For example, in some cases the end-user application communicates with the GPU via an application programming interface (API). The API allows the end-user application to output graphics data and commands in a standardized format, rather than in a format that is dependent on the GPU.

Many GPUs include graphics pipelines for executing instructions of graphics applications. A graphics pipeline includes a plurality of processing blocks that work on different steps of an instruction at the same time. Pipelining enables a GPU to take advantage of parallelism that exists among the steps needed to execute the instruction. As a result, a GPU can execute more instructions in a shorter period of time. The output of the graphics pipeline is dependent on the state of the graphics pipeline. The state of a graphics pipeline is updated based on state packages (e.g., context-specific constants including texture handlers, shader constants, transform matrices, and the like) that are locally stored by the graphics pipeline. Because the context-specific constants are locally maintained, they can be quickly accessed by the graphics pipeline.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
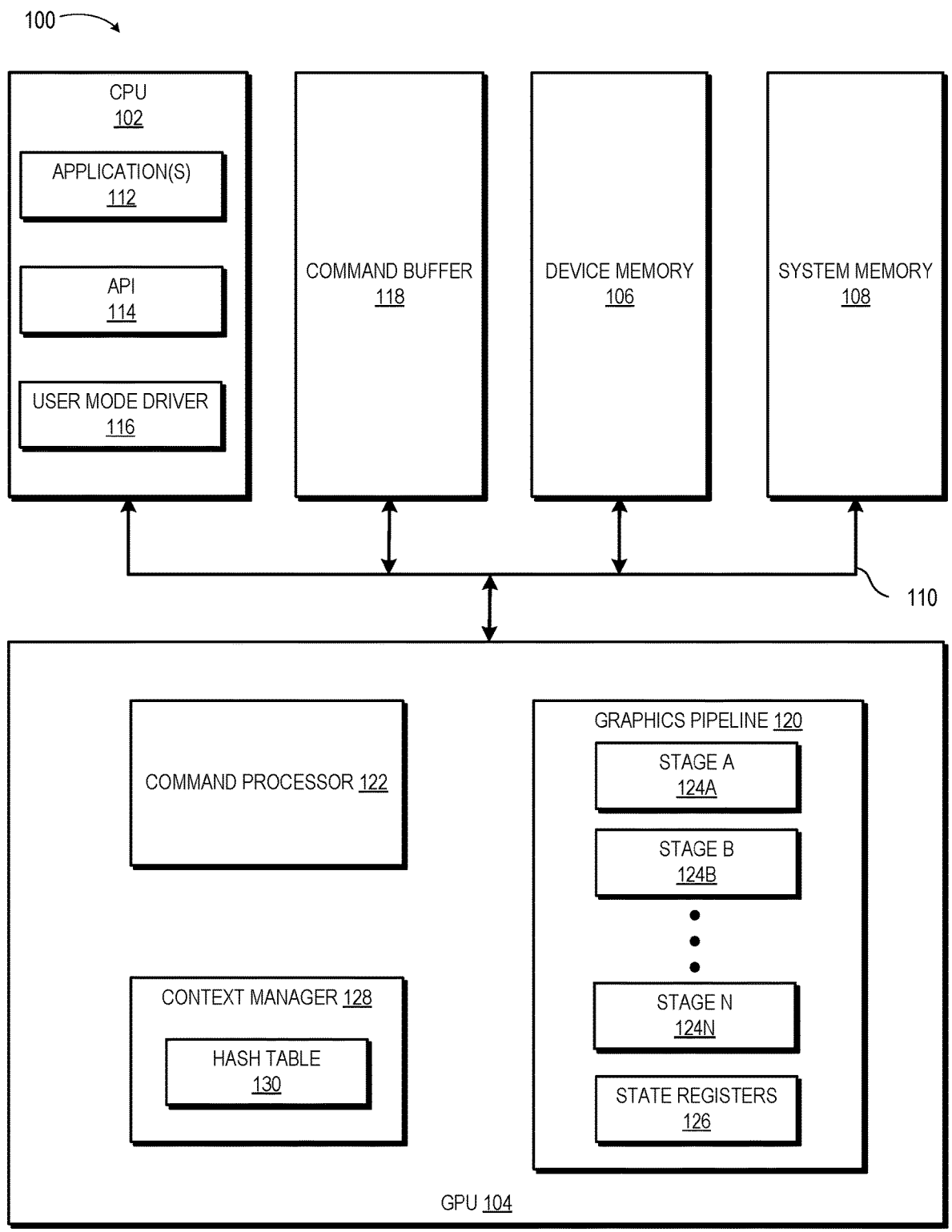
FIG. 1 is a block diagram illustrating a system including a graphics processing unit configured to employ graphics context bouncing in accordance with some embodiments.

To perform graphics processing, a central processing unit (CPU) of a system often issues to a GPU a call, such as a draw call, which includes a series of commands instructing the GPU to draw an object according to the CPU's instructions. As the draw call is processed through the GPU graphics pipeline, the draw call uses various configurable settings to decide how meshes and textures are rendered. A common GPU workflow involves updating the values of constants in a memory array and then performing a draw operation using the constants as data. A GPU whose memory array contains a given set of constants may be considered to be in a particular state. These constants and settings, referred to as context state (also referred to as "rendering state", "GPU state", or simply "state"), affect various aspects of rendering and include information the GPU needs to render an object. The context state provides a definition of how meshes are rendered and includes information such as the current vertex/index buffers, the current vertex/pixel shader programs, shader inputs, texture, material, lighting, transparency, and the like. The context state contains information unique to the draw or set of draws being rendered at the graphics pipeline. Context therefore refers to the required GPU pipeline state to correctly draw something.

Many GPUs use a technique known as pipelining to execute instructions. Pipelining enables a GPU to work on different steps of an instruction at the same time, thereby taking advantage of parallelism that exists among the steps needed to execute the instruction. As a result, the GPU can execute more instructions in a shorter period of time. The video data output by the graphics pipeline are dependent on state packages (e.g., context-specific constants) that are locally stored by the graphics pipeline. In GPUs, it is common to set up the state of the GPU, perform a draw operation, and then make only a small number of changes to the state before the next draw operation. The state settings (e.g. values of constants in memory) often remain the same from one draw operation to the next.

The context-specific constants are locally maintained for quick access by the graphics pipeline. However, GPU hardware is generally memory constrained and only locally stores (and therefore operates on) a limited number of sets of context state. Accordingly, the GPU will often change context state in order to start working on a new set of context registers because the graphics pipeline state needs to be changed to draw something else. The GPU performs a context roll to a newly supplied context to release the current context by copying the current registers into a newly allocated context before applying any new state updates by programming fresh register values. Due to the limited number of context state sets stored locally, the GPU sometimes runs out of context and the graphics pipeline is stalled while waiting for a context to be freed so that a new context may be allocated. In various embodiments, the CPU reuses a context state that was previously active, and without context bouncing would release the current context and allocate a new one. If no context is available, the GPU would have to wait for one to be freed, thus introducing a stall.

To improve GPU system performance, FIGS. 1-4 illustrate systems and methods for context state management by assigning hash-based identifiers to context states and switching to matching context (referred to as context bouncing) without allocating a new context. In various embodiments, a method of context bouncing includes receiving, at a command processor of a graphics processing unit (GPU), a conditional execute packet providing a hash identifier corresponding to an encapsulated state. The encapsulated state includes one or more context state packets following the conditional execute packet. A command packet following the encapsulated state is executed based at least in part on determining whether the hash identifier of the encapsulated state matches one of a plurality of hash identifiers of active context states currently stored at the GPU. In various embodiments, determining whether the hash identifier of the encapsulated state matches one of a plurality of hash identifiers includes querying a context manager to search a hash table storing the plurality of hash identifiers of active context states currently stored at the GPU.

In some embodiments, context bouncing also includes draining the encapsulated state in response to determining the hash identifier matches one of the plurality of hash identifiers of active context states. In other embodiments, a new context state set is allocated in response to determining the hash identifier does not match any of the plurality of hash identifiers of active context states. Additionally, one or more context state packets of the encapsulated state are executed prior to executing the command packet. Bouncing back to an existing context (i.e., without allocating a new context) reduces the likelihood of running out of context and stalling the graphics pipeline.

FIG. 1 is a block diagram illustrating a system 100 including a graphics processing unit configured to employ graphics context bouncing in accordance with some embodiments. In the depicted example, the system 100 includes a central processing unit (CPU) 102, a graphics processing unit (GPU) 104, a device memory 106 utilized by the GPU 104, and a system memory 108 shared by the CPU 102 and the GPU 104. In various embodiments, the GPU 104 may be a dedicated device, several devices, or integrated into a larger device (e.g., a north bridge device). The memories 106, 108 include any of a variety of random access memories (RAMs) or combinations thereof, such as a double-data-rate dynamic random access memory (DDR DRAM), a graphics DDR DRAM (GDDR DRAM), and the like. The GPU 104 communicates with the CPU 102, the device memory 106, and the system memory 108 via a bus 110. The bus 110 includes any type of bus used in computing systems, including, but not limited to, a peripheral component interface (PCI) bus, an accelerated graphics port (AGP) bus, a PCI Express (PCIE) bus, and the like.

The CPU 102 sends instructions intended for processing at the GPU 104 to command buffers. In various embodiments, the command buffer may be located, for example, in system memory 108 in a separate memory coupled to the bus 110 (e.g., device memory 106).

As illustrated, the CPU 102 includes a number of processes, such as executing one or more application(s) 112 to generate graphic commands and a user mode driver 116 (or other drivers, such as a kernel mode driver). In various embodiments, the one or more applications 112 include applications that utilizes the functionality of GPU 104. An application 112 may include one or more graphics instructions that instruct GPU 104 to render a graphical user interface (GUI) and/or a graphics scene. For example, the graphics instructions may include instructions that define a set of one or more graphics primitives to be rendered by GPU 104.

In some embodiments, the application 112 utilizes a graphics application programming interface (API) 114 to invoke a user mode driver 116 (or a similar GPU driver. User mode driver 116 issues one or more commands to GPU 104 for rendering one or more graphics primitives into displayable graphics images. Based on the graphics instructions issued by application 112 to the user mode driver 116, the user mode driver 116 formulates one or more graphics commands that specify one or more operations for GPU 104 to perform for rendering graphics. In some embodiments, the user mode driver 116 is a part of the application 112 running on the CPU 102. For example, the user mode driver 116 may be part of a gaming application running on the CPU 102. Similarly, a kernel mode driver (not shown) may be part of an operating system running on the CPU 102. The graphics commands generated by the user mode driver 116 include graphics commands intended to generate an image or a frame for display. The user mode driver 116 translates standard code received from the API 114 into a native format of instructions understood by the GPU 104. The user-mode driver 116 is typically written by the manufacturer of the GPU 104. Graphics commands generated by the user mode driver 116 are sent to GPU 104 for execution. The GPU 104 can then execute the graphics commands and use the results to control what is displayed on a display screen.

In various embodiments, the CPU 102 sends graphics commands intended for the GPU 104 to a command buffer 118. Although depicted in FIG. 1 as a separate module for ease of illustration, the command buffer 118 may be located, for example, in device memory 106, system memory 108, or a separate memory communicably coupled to the bus 110. The command buffer 118 temporarily stores a stream of graphics commands that include input to the GPU 104. The stream of graphics commands include, for example, one or more command packets and/or one or more state update packets. In some embodiments, a command packet includes a draw command (also interchangeably referred to as a "draw call") instructing the GPU 104 to execute processes on image data to be output for display. For example, a draw command may instruct the GPU 104 to render defined by a group of one or more vertices (e.g., defined in a vertex buffer) stored in memory. The geometry defined by the group of one or more vertices correspond, in some embodiments, to a plurality of primitives to be rendered.

In various embodiments, a state command (also interchangeably referred to as a "context state packet" or "state update packet") instructs the GPU 104 to change one or more state variables (e.g., a draw color). In some embodiments, a context state packet includes a constant or a set of constants that update the state of graphics pipeline 120 at the GPU 104. A state update packet may, for example, update colors that are to be drawn or blended during execution of a draw call. Although described here in the context of draw calls and context state packets, those skilled in the art will recognize that other commands may be utilized without departing from the scope of this disclosure.

The GPU 104 includes a command processor 122 that receives commands in a command stream to be executed from the CPU 102 (e.g., via the command buffer 118 and bus 110) and coordinates execution of those commands at the graphics pipeline 120. In various embodiments, the command processor 122 is implemented in hardware, firmware, software, or a combination thereof. The command stream includes one or more draw calls and context state packets, as described above. The command processor 122 also manages the con text states written to registers of the graphics pipeline 120. In various embodiments, in response to receiving a context state packet, the command processor sets one or more state registers in the GPU 104 to particular values based on the context state packet and/or configures one or more of fixed-function processing units based on the context state packet.

Although illustrated in FIG. 1 as having one command processor 122, those skilled in the art will recognize that the GPU 104 may include any number and type of command processors for retrieving and executing packets from hardware queues. In various embodiments, a "packet" refers to a memory buffer encoding a single command. Different types of packets may be stored in hardware queues, memory buffers, and the like. Additionally, as used herein, the term "block" refers to a processing module included in an ASIC, an execution pipeline of a CPU, and/or a graphics pipeline of a GPU. Such a processing module may include, but is not limited to, an arithmetic logic unit, a multiply/divide unit, a floating point unit, a color buffer, a vertex shader, a pixel shader, a clipping unit, or some other processing module as would be apparent to a person skilled in the art.

The graphics pipeline 120 includes a number of stages 124, including stage A 124a, stage B 124b, and through stage N 124n. In various embodiments, the various stage 124 each represent a stage of the graphics pipeline 120 that execute various aspects of a draw call. The command processor 122 writes context state updates to local banks of context registers for storing and updating operating state. As illustrated in FIG. 1, the command processor writes state updates to current state registers 126.

Conventional context management techniques dispatch information or command packets to buffers (sometimes referred to as queue buffers). Such queue buffers are created in a first-in-first-out (FIFO)-like sequence to which running programs submits commands. However, due to memory capacity at the GPUs, only a limited number of unique rendering state sets may be stored and therefore operated on in the graphics pipeline at any given moment. Accordingly, sequential processes may be run on one state set but if the driver changes context state after performing a draw operation, the CP must execute a sequence of register writes followed by a read to ensure completion once the GPU changes to a different state set. This context rolling process for a new context includes the command processor 122 sending an event down the graphics pipeline to release the current context. Once completed, the command processor is notified and allows the context to be reused (or a new context to be allocated). However, these context rolling processes increases the likelihood of running out of contexts to use and stalling the graphics pipeline until the draw call associated with the current context completes processing through the various stages of the graphics pipeline. In general, GPU operations are pipelined with various amounts of work in flight at any given moment; stalling the graphics pipeline such that in-flight tasks must retire before changing state increases likelihood of starving the GPU backend.

To more efficiently manage context states, the GPU 104 includes a graphics context manager 128. The graphics context manager 128 maintains a hash table 130 storing a set of hash-based identifiers corresponding to sets of context state currently stored at registers of the GPU 104. The graphics context manager 128 further includes a context allocation logic module 132 for performing the hash identifier search and context allocation operations described herein. As described further herein, the user mode driver 116 provides a unique hash identifier to identify a new context state that the user mode driver 116 programs into a graphics command. In various embodiments, the user mode driver 116 indicates to the command processor 122, via a new state packet (or other token method), to scan for all active states at the GPU 104 and determine whether the unique hash identifier of the new context matches any one of the plurality of hash identifiers of currently active context states (i.e., hash identifiers stored at the hash table 130).

In some embodiments, the command processor 122 queries the graphics context manager 128 to search the hash table 130 for determining whether the hash table 130 stores the requested unique hash identifier corresponding to the new context (i.e., indicating that the context is available for use). If the hash table 130 does not contain the requested unique hash identifier, then the graphics context manager 128 allocates a new context using the requested unique hash identifier. However, if the hash table 130 does contain the requested unique hash identifier (thereby informing that the requested unique hash identifier corresponds to a state that is already active at the GPU 104), then the graphics context manager 128 returns that context.

Instead of allocating a new context or potentially waiting for a context to free up (thereby resulting in a graphics pipeline stall), the GPU 104 performs context bouncing by switching back to the existing, matching context that is already running at the GPU 104 without allocating a new context (e.g., in a manner similar to how a cache memory shares cache lines). Accordingly, the GPU 104 can run non-sequential processes on multiple state sets provided that the state sets are still available (i.e., loaded at the GPU 104). This approach more efficiently utilizes the onboard state of the GPU 104 and reduces a number of stalls associated with running out of contexts to use, especially when the application 112 is quickly toggling between a small number of states (which would involve context rolling and acquiring new states as the state changes after each draw in conventional context management techniques, and quickly running out of context).

Figure 2:
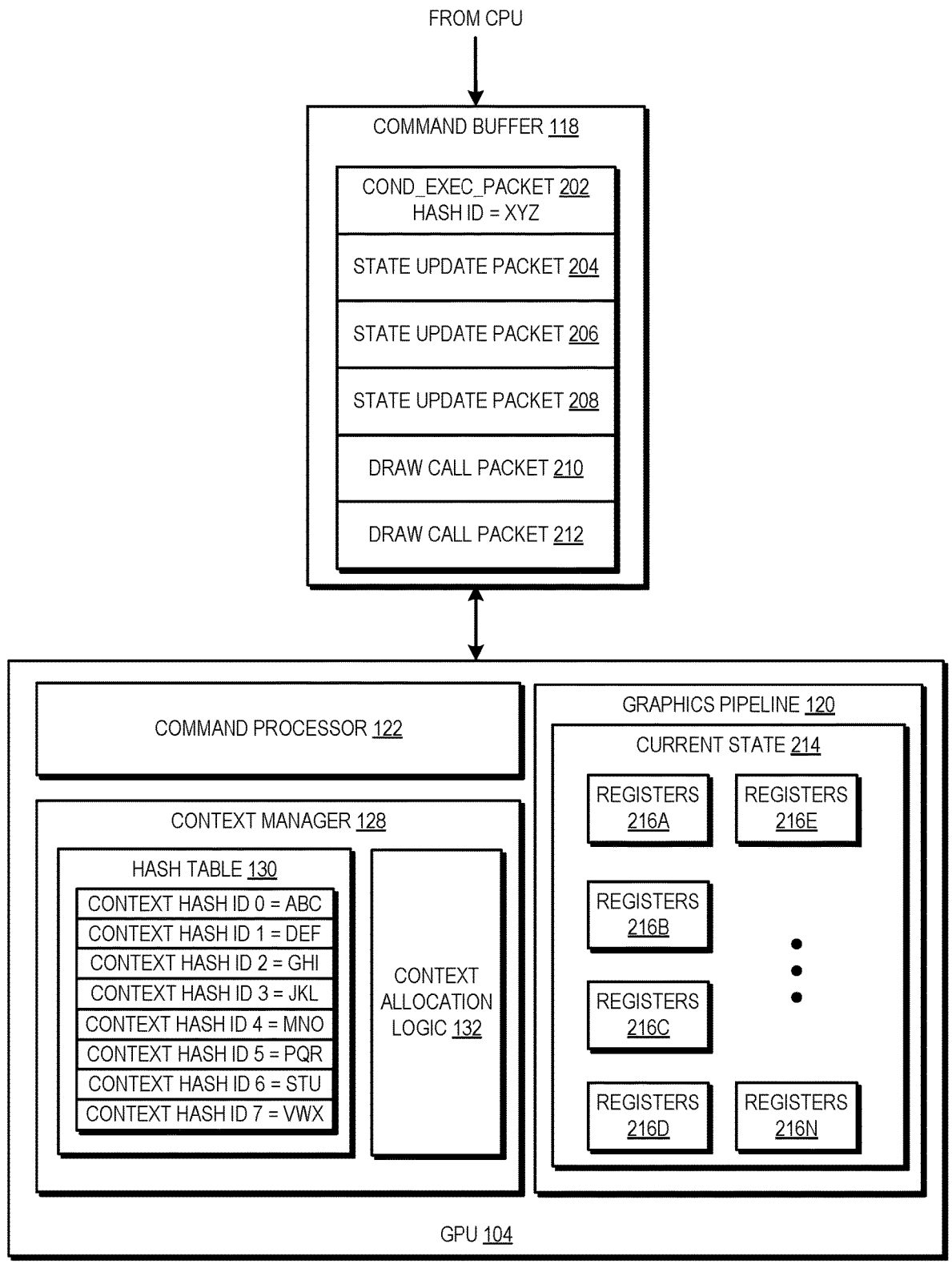
FIG. 2 is a block diagram illustrating processing of command stream instructions at the GPU of FIG. 1 in accordance with some embodiments.

FIG. 2 is a block diagram illustrating an embodiment in which the CPU 102 sends instructions intended for the GPU 104 in accordance with some embodiments. As illustrated, the CPU 102 sends instructions to the command buffer 118. The command buffer 118 temporarily stores commands of the command stream from the CPU 102. The stream of commands includes, for example, conditional execution packets, state update packets, and draw call packets. In various embodiments, other commands may be included in the stream of commands as would be apparent to a person skilled in the art.

A conditional execute packet is a command inserted by the user mode driver 116 of FIG. 1 (or other software driver) which provides the hash identifier corresponding to one or more context state packets following the conditional execute packet. In some embodiments, the conditional execute packet also includes dword data corresponding to the size of the next group of context state packets in dwords (which is short for "double word"). As the context state packets vary in size from a single dword to many dwords, the dword data defines a number N of context state packages associated with the hash identifier of the conditional execute packet and further represents all the context register updates required to setup the context state for the next draw(s) following that hash identifier. Additionally, as further described herein, the dword data also defines a number of dwords to discard if the graphics context manager 128 returns and indicates that context associated with that hash identifier is already active at the GPU 104. Based on that determination, the command processor 122 pulls from the command buffer 118 based on that given dword data size until all the state associated with that particular hash ID (as provided by the conditional execute packet) is discarded.

A state update packet is a constant or a collection of constants that update the state of graphics pipeline 120. A state update packet may, for example, update colors that are to be blended during execution of a draw command. In some embodiments, a state update packet includes a set context packet that programs multi-context registers of the GPU 104. The set context packet includes all data required to program the state in the packet. In other embodiments, a state update packet also includes a load context packet which requires fetching context information from memory before the state is written to context registers of the GPU 104. A draw call packet is a command that causes graphics pipeline 120 to execute processes on data to be output for display.

The execution of a draw call is dependent on all the state updates that were retrieved since a previous draw call. For example, FIG. 2 illustrates six commands that are included in the command stream—(1) a conditional execute packet 202, (2) a first state update packet 204, (3) a second state update packet 206, (4) a third state update packet 208, (5) a first draw call packet 210, and (6) a second draw call packet 212. The draw call packet 210 is dependent on the first, second, and third state update packets 204-208 because these are the state updates that are encapsulated by the conditional execute packet 202 prior to the next draw command (i.e., draw call packet 210). As used herein, the term "encapsulated" refers to a number of packets used to define a given hash identifier. Accordingly, the term "encapsulated state" refers to a number of context state packets that can be conditionally executed or discarded depending on whether that given hash identifier is available (e.g., stored at registers of the GPU 104) to context bounce/switch to. In other words, an encapsulated state is a collection of context state packets used to define a given hash identifier.

In one embodiment, the output of operations executed by the GPU 104 is dependent on a current context state 214. In various embodiments, the current context state 214 is based on the values of various context-specific constants such as texture handlers, shader constants, transform matrices, and the like which are stored in state registers. As illustrated in FIG. 2, the current context state 214 includes registers 216A through 216N, which are representative of any number and type (e.g., general purpose register) of state registers and instruction pointer. It is noted that current context state 214 can also include other variables and other values which define the current architectural state of the GPU 104. It is also noted that a "context state" of a processing unit can also be referred to as a "context" or as a "state" of the processing unit. In various embodiments, the processing unit is a CPU (e.g., GPU 104 of FIGS. 1-2). In other embodiments, the processing unit includes other types of processing units. It is noted that the terms "processing unit" and "processor" are utilized interchangeably herein.

In operation, the command processor 122 receives the conditional execute packet 202. The conditional execute packet 202 informs, before the next draw command (e.g., draw call packet 210), the command processor 122 of the unique hash identifier associated with the upcoming state update packets 204-208. The command processor 122 queries the context manager 128 to search the hash table 130 to determine whether the unique hash identifier provided by the conditional execute packet 202 is active at the GPU 104 (and therefore stored at the hash table 130).

As illustrated in FIG. 2, the conditional execute packet 202 provides a unique hash identifier of XYZ. The command processor 122 queries the context manager 128 and determines that hash identifier XYZ is not present in the hash table 130. Accordingly, based on that query miss, the context manger 128 retires one of the existing hash identifiers in hardware (as tracked at the hash table 130) and allocates a new context. In various embodiments, the context manager 128 retires the least recently used (LRU) inactive hash identifier in hash table 130. The retired hash identifier is replaced with the hash identifier supplied for the query (e.g., hash identifier XYZ in this discussion) for that new context. Additionally, based on that determination of no match for the hash identifier XYZ at hash table 130, the context manager 128 indicates the query miss back to the command processor 122 and returns the new context. The command processor 122 then processes the encapsulated state by executing the state update packets 204-208. In other words, a query miss causes the GPU 104 to perform context rolling to allocate a new context, execute the upcoming state update packets 204-208, and set up the next state with the new hash identifier (i.e., hash identifier XYZ).

Figure 3:
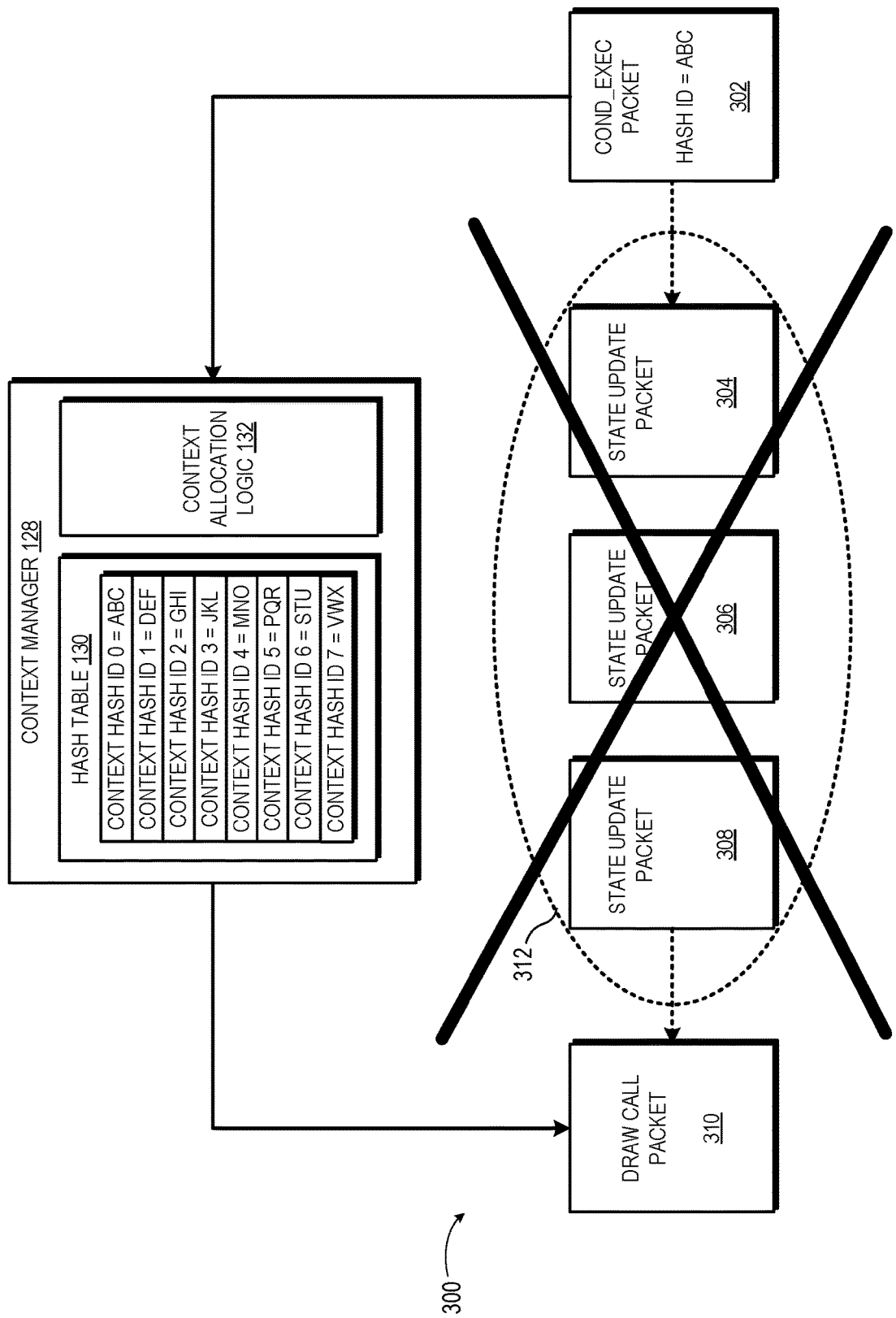
FIG. 3 is a block diagram illustrating draining of encapsulated state at the GPU of FIG. 1 in accordance with some embodiments.

FIG. 3 is a block diagram illustrating draining of encapsulated state in accordance with some embodiments. In another embodiment, but with continued reference to FIG. 2, a command stream 300 at command buffer 118 includes five commands—(1) a conditional execute packet 302, (2) a first state update packet 304, (3) a second state update packet 306, (4) a third state update packet 308, and (5) a draw call packet 310. The draw call packet 310 is dependent on the first, second, and third state update packets 304-308 because these are the state updates that are encapsulated by the conditional execute packet 302 prior to the next draw command (i.e., draw call packet 310). The first, second, and third state update packets 304-308 are collectively referred to as the encapsulated state 312. In this embodiment, the encapsulated state 312 includes three of the context state packets (i.e., as defined by conditional execute packet 302) that can be conditionally executed or discarded depending on whether that given hash identifier is available (e.g., stored at registers of the GPU 104) to context bounce/switch to.

As illustrated in FIG. 3, the conditional execute packet 302 provides a unique hash identifier of ABC. Referring back to FIG. 2, the command processor 122 queries the context manager 128 and determines that hash identifier ABC is present in the hash table 130. Accordingly, based on that query hit, the context manager 128 returns the context associated with the queried hash identifier (i.e., hash identifier ABC). The command processor 122 then drains the encapsulated state 312 (e.g., skipping and discarding state update packets 304-308) and assigns the context matching the query hit for execution of the draw call packet 310 using an existing context hash identifier. By determining that a desired hash identifier is available for use, switching to the context for that hash identifier, and discarding any command packets that would have redefined that context, the GPU 104 improves operating efficiency by realizing that the requested hash identifier is currently available at GPU hardware and switching to it rather than forcing the processor to stall from lack of available contexts.

Figure 4:
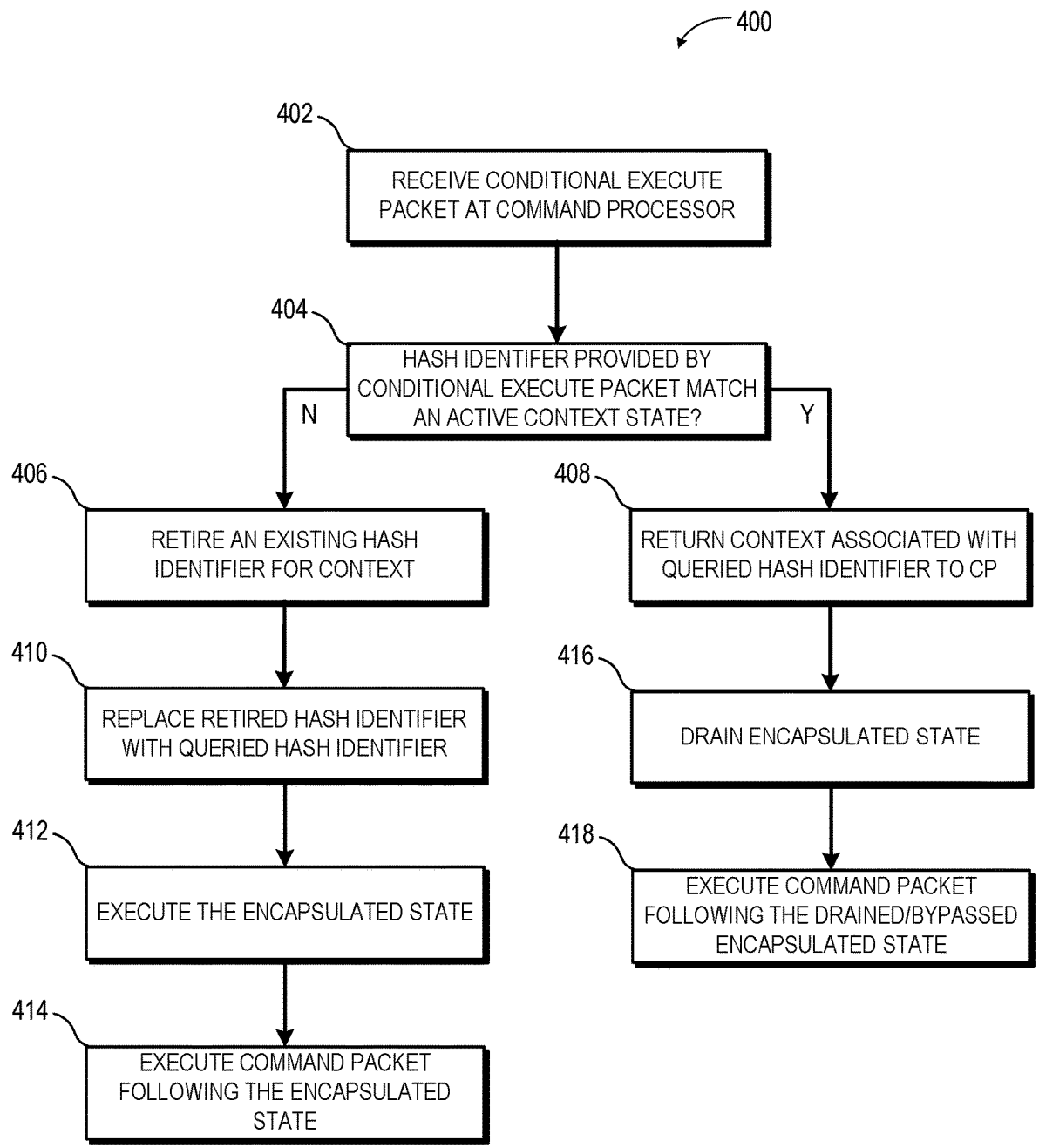
FIG. 4 is a flow diagram illustrating a method of graphics context bouncing in accordance with some embodiments.

FIG. 4 is a flow diagram illustrating a method 400 of graphics context bouncing in accordance with some embodiments. At block 402, a command processor of a graphics processing unit (GPU) receives a conditional execute packet providing a hash identifier corresponding to an encapsulated state. For example, with reference to FIG. 2, the command processor 122 receives conditional execute packet 202 from the command buffer 118. The conditional execute packet 202 defines an encapsulated state corresponding to one or more context state packets following the conditional execute packet (e.g., state update packets 204-208 of FIG. 2). In various embodiments, the conditional execute packet 202 defines a unique hash identifier associated with the encapsulated state (e.g., hash identifier XYZ at conditional execute packet 202 of FIG. 2 or hash identifier ABC at conditional execute packet 302 of FIG. 3). Additionally, in some embodiments, the conditional execute packet 202 also includes dword data corresponding to the size of the group of context state packets for the encapsulated state.

At block 404, the command processor determines whether the hash identifier of the encapsulated state matches one of a plurality of hash identifiers of active context states currently stored at the GPU. For example, with reference to FIG. 2, the command processor 122 queries the context manager 128 to search hash table 130 storing a plurality of hash identifiers of active context states currently stored at the GPU.

If the command processor determines that the hash identifier of the encapsulated state does not matches any of the plurality of hash identifiers of active context states currently stored at the GPU, the method 400 proceeds to block 406. However, if the command processor determines that the hash identifier of the encapsulated state matches one of the plurality of hash identifiers of active context states currently stored at the GPU, the method 400 proceeds to block 408.

At block 406, and with continued reference to FIG. 2, the context manger 128 retires one of the inactive existing hash identifiers in hardware (as tracked at the hash table 130) and allocates a new context based on the query miss from context manager 128 determining that hash identifier XYZ is not present in the hash table 130. In some embodiments, the context manager 128 retires the least recently used (LRU) hash identifier in hash table 130. At block 410, the context manger 128 replaces the retired hash identifier with the hash identifier supplied for the query (e.g., hash identifier XYZ in this discussion) for that new context. Additionally, in various embodiments, the context manager 128 indicates the query miss back to the command processor 122 and returns the new context.

At block 412, the command processor 122 processes the encapsulated state by executing the state update packets 204-208. In other words, a query miss causes the GPU 104 to perform context rolling to allocate a new context state set, execute the upcoming state update packets 204-208, and set up the next state with the new hash identifier (i.e., hash identifier XYZ). Subsequently, at block 414, the command processor 122 executes the command packet following the encapsulated state (e.g., state draw call packet 210 of FIG. 2).

Returning now to block 408, and with reference to FIG. 3, the context manger 128 returns the context associated with the queried hash identifier (e.g., hash identifier ABC as provided by conditional execute packet 302 of FIG. 3) to the command processor 122 based on the query hit from context manager 128 determining that hash identifier ABC is present in the hash table 130. At block 416, the command processor 122 drains the encapsulated state 312 (e.g., skipping and discarding state update packets 304-308) and assigns the context matching the query hit for execution of the draw call packet 310 using an existing context hash identifier. Subsequently, at block 418, the command processor 122 executes the command packet following the bypassed encapsulated state 312. By determining that a desired hash identifier is available for use, switching to the context for that hash identifier, and discarding any command packets that would have redefined that context, the GPU 104 improves operating efficiency by realizing that the requested hash identifier is currently available at GPU hardware and switching to it rather than forcing the processor to stall from lack of available contexts.

In various embodiments, a context done event is sent down the graphics pipeline when a context is rolled. The context manager increments a counter indicating that there is a context done event outstanding. Further, in various embodiments, a context is only allowed to recycle when there are no pending context done events in the graphics pipeline.

For illustrative purposes, and not limitation, a graphics context bouncing system in accordance with various embodiments is described herein in terms of a GPU that executes a stream of draw commands based on context states of a graphics pipeline of the GPU. It is to be appreciated, however, that such a graphics context bouncing system is applicable to other types of ASICs or systems that execute a stream of commands based on the state of the respective systems. Based on the description contained herein, a person skilled in the relevant art(s) will understand how to implement embodiments of the present invention in such other types of systems. Additionally, those skilled in the art will recognize that numerous details are set forth herein (e.g., specific numbers and arrangements of processor configurations, microarchitectural details, logic partitioning/integration details, sequences of operations, types, interrelationships of system components, numbers of unique context state sets stored at the GPU, and the like). However, it is understood that the graphics context bouncing described herein may be performed for any number of individual registers, register banks, and/or unique sets of context state without departing from the scope of this disclosure.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   receiving, at a command processor of a graphics processing unit (GPU), a conditional execute packet providing an identifier corresponding to an encapsulated state, the encapsulated state including one or more context state packets following the conditional execute packet; and
   executing, based at least in part on determining whether the identifier of the encapsulated state matches one of a plurality of stored identifiers of active context states currently stored at the GPU, a command packet following the encapsulated state.

2. The method of claim 1, wherein determining whether the identifier of the encapsulated state matches one of a plurality of stored identifiers comprises:
   querying a context manager to search an identifier table storing the plurality of stored identifiers of active context states currently stored at the GPU.

3. The method of claim 2, further comprising:
   draining, in response to determining the identifier matching one of the plurality of stored identifiers of active context states, the encapsulated state; and
   assigning the matching one of the plurality of stored identifiers of active context states to the command packet following the encapsulated state.

4. The method of claim 2, further comprising:
   allocating, in response to determining the identifier does not match any of the plurality of stored identifiers of active context states, a new context state set; and
   executing the one or more context state packets of the encapsulated state prior to executing the command packet.

5. The method of claim 4, further comprising:
   retiring, from the identifier table, one the plurality of stored identifiers of active context states currently stored at the GPU; and
   storing, at the identifier table, the identifier corresponding to the encapsulated state for the new context state set.

6. The method of claim 1, wherein the command packet includes a draw call.

7. The method of claim 1, wherein the command packet designates a size of the encapsulated state for a number of state update packets.

8. The method of claim 1, wherein the identifier corresponding to the encapsulated state corresponds to a hashed representation of the encapsulated state.

9. A processor, comprising:
   a plurality of state registers; and
   a command processor, wherein the command processor is configured to:
   receive a conditional execute packet that includes an identifier corresponding to an encapsulated state, wherein the encapsulated state includes one or more context state packets following the conditional execute packet; and
   execute, based at least in part on determining whether the identifier of the encapsulated state matches one of a plurality of stored identifiers of active context states currently stored at the processor, a command packet following the encapsulated state.

10. The processor of claim 9, further comprising:
    a context manager including an identifier table storing the plurality of stored identifiers of active context states currently stored at the processor.

11. The processor of claim 10, wherein the processor is configured to query the context manager to search the identifier table for the provided identifier.

12. The processor of claim 10, wherein the processor is further configured to:
    drain, in response to determining the identifier matching one of the plurality of stored identifiers of active context states, the encapsulated state; and
    assign the matching one of the plurality of stored identifiers of active context states to the command packet following the encapsulated state.

13. The processor of claim 10, wherein the processor is further configured to:
    allocate, in response to determining the identifier does not match any of the plurality of stored identifiers of active context states, a new context state set; and
    execute the one or more context state packets of the encapsulated state prior to executing the command packet.

14. The processor of claim 13, wherein the processor is further configured to:
    retire, from the identifier table, one the plurality of stored identifiers of active context states currently stored at the processor; and
    store, at the identifier table, the identifier corresponding to the encapsulated state for the new context state set.

15. The processor of claim 9, wherein the command packet designates a size of the encapsulated state for a number of state update packets.

16. The processor of claim 9, wherein the identifier corresponding to the encapsulated state includes a hashed representation of the encapsulated state.

17. A non-transitory computer readable medium embodying a set of executable instructions, the set of executable instructions to manipulate at least one processor to:
    receive, at a command processor of the processor, a conditional execute packet providing an identifier corresponding to an encapsulated state, wherein the encapsulated state includes one or more context state packets following the conditional execute packet; and
    execute, based at least in part on determining whether the identifier of the encapsulated state matches one of a plurality of stored identifiers of active context states currently stored at the processor, a command packet following the encapsulated state.

18. The non-transitory computer readable medium of claim 17, the set of executable instructions to further manipulate at least one processor to:
    query a context manager to search an identifier table storing the plurality of stored identifiers of active context states currently stored at the processor.

19. The non-transitory computer readable medium of claim 18, the set of executable instructions to further manipulate at least one processor to:

drain, in response to determining the identifier matching one of the plurality of stored identifiers of active context states, the encapsulated state; and assign the matching one of the plurality of stored identifiers of active context states to the command packet following the encapsulated state.

20. The non-transitory computer readable medium of claim 18, the set of executable instructions to further manipulate at least one processor to:

allocate, in response to determining the identifier does not match any of the plurality of stored identifiers of active context states, a new context state set; and execute the one or more context state packets of the encapsulated state prior to executing the command packet.

21. The non-transitory computer readable medium of claim 20, the set of executable instructions to further manipulate at least one processor to:

retire, from the identifier table, one the plurality of stored identifiers of active context states currently stored at the processor; and store, at the identifier table, the identifier corresponding to the encapsulated state for the new context state set.

22. The non-transitory computer readable medium of claim 17, wherein the command packet designates a size of the encapsulated state for a number of state update packets.

23. The non-transitory computer readable medium of claim 17, wherein the identifier corresponding to the encapsulated state corresponds to a hashed representation of the encapsulated state.

* * * * *